United States Patent [19]

Rust

[11] Patent Number: 4,806,903
[45] Date of Patent: Feb. 21, 1989

[54] BACKLITE ASSEMBLY FOR AN AUTOMOTIVE VEHICLE

[75] Inventor: John L. Rust, Belleville, Mich.

[73] Assignee: Ford Motor Company, Dearborn, Mich.

[21] Appl. No.: 90,877

[22] Filed: Dec. 15, 1986

[51] Int. Cl.$^4$ .............................................. B60Q 1/44
[52] U.S. Cl. ...................................... 340/97; 340/87; 362/31
[58] Field of Search ............... 340/97, 87, 71, 815.31, 340/815.33, 67, 70; 40/546, 547; 362/31, 80

[56] References Cited

U.S. PATENT DOCUMENTS

| | | |
|---|---|---|
| 1,499,688 | 7/1924 | Palmer et al. . |
| 1,759,782 | 5/1930 | Fox . |
| 2,350,599 | 6/1944 | Feldheim . |
| 2,604,807 | 7/1952 | Woodburn . |
| 2,623,313 | 12/1952 | Fuchs .................... 340/815.31 X |
| 2,695,354 | 11/1954 | Neugass . |
| 3,131,496 | 5/1964 | Schropp ...................... 362/31 X |
| 3,162,375 | 12/1964 | Huston . |
| 3,317,906 | 5/1967 | Baldridge . |
| 4,321,655 | 3/1982 | Bouvrande . |
| 4,364,596 | 0/1982 | Geisendorfer ................ 362/31 X |
| 4,488,141 | 12/1984 | Ohlenforst et al. . |
| 4,729,185 | 3/1988 | Baba ................................ 40/546 |

FOREIGN PATENT DOCUMENTS

| | | |
|---|---|---|
| 2242316 | 2/1974 | Fed. Rep. of Germany . |
| 2250324 | 5/1975 | France . |

Primary Examiner—Joseph A. Orsino
Assistant Examiner—Brian R. Tumm
Attorney, Agent, or Firm—Jerome R. Drouillard; Roger L. May

[57] ABSTRACT

A backlite assembly for an automotive vehicle with a signaling system includes a backlite panel, an illumination system positioned at one edge of the panel for selectively introducing light into the interior of the panel whenever the signaling system is energized, and a refractive surface integrated with the panel for refracting the light emitted by the illumination system so that light will be emitted from the backlite in a pattern recognizable as a signal. The backlite assembly may include turn signaling capability and brakelight function, as well as a hazard warning signal function.

10 Claims, 2 Drawing Sheets

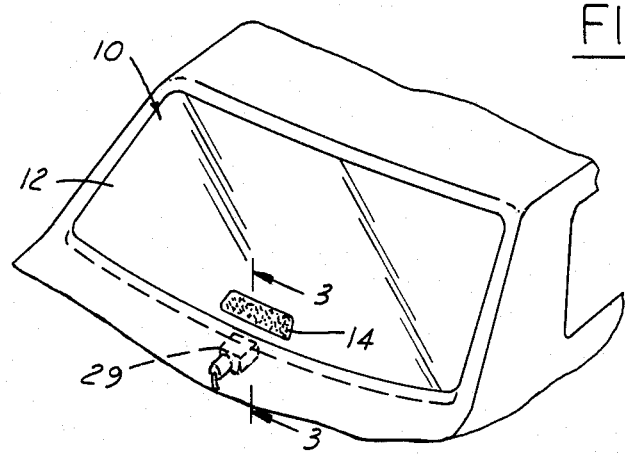
FIG. 1
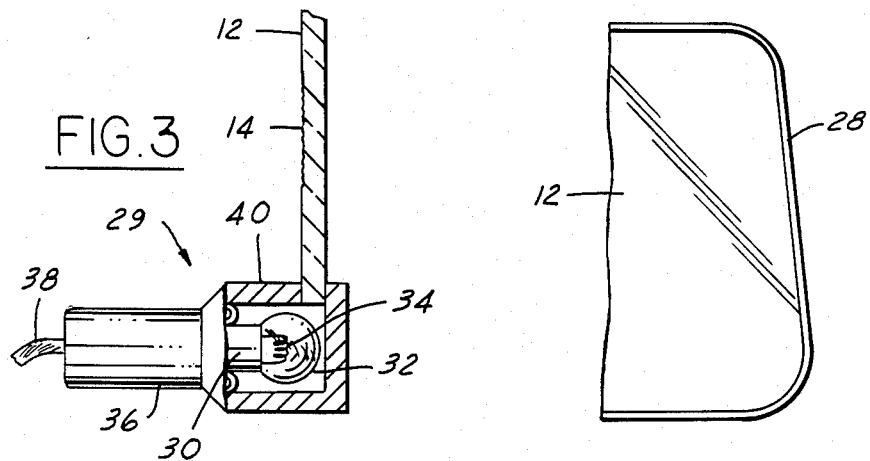
FIG. 3
FIG. 4
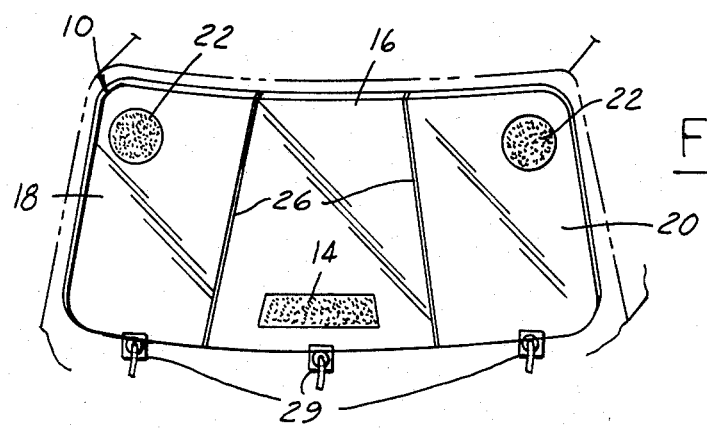
FIG. 2

BACKLITE ASSEMBLY FOR AN AUTOMOTIVE VEHICLE

BACKGROUND OF THE INVENTION

1. Field of the Invention

This invention relates to a backlite assembly for an automotive vehicle including a novel signaling system associated with the backlite.

2. Disclosure Information

Indirect lighting has been used by designers of signs and other devices for many years. As an example, U.S. Pat. No. 1,759,782 discloses a sign including a flat glass plate having a design etched upon it and an incandescent electric bulb situated so as to transmit light into the edge of the glass pane. Light is then emitted from the design etched into the pane. A similar device is shown in U.S. Pat. No. 1,499,688 in which an edge-illuminated glass body has inset colored indicia which are illuminated by a light bulb.

U.S. Pat. No. 4,364,596 discloses a deflector shield for an automobile in which edge illumination is used to highlight a design engraved upon the deflector shield.

Instrument panel designers have utilized edge illumination for lighting of individual instruments. Examples of such illumination are found in U.S. Pat. Nos. 2,695,354; 3,162,375; and 4,321,655.

Automotive designers have utilized various schemes in efforts to produce front windshields affording more than the usual display of the area being approached by the vehicle. U.S. Pat. No. 2,604,807 discloses a windshield having a refractive area intended to redirect light emanating from a traffic signal so that the light impinges upon the driver's eyes. U.S. Pat. Nos. 2,350,599 and 3,317,906, on the other hand, disclose structures for providing a vehicle driver with a windshield display of his instruments.

The use of liquid crystal semiconductor devices to provide a windshield display is disclosed in French patent No. 2,250,324 and German patent No. 2,242,316. These displays are operatively associated with the vehicle's instruments. These systems are complicated inasmuch as they require the semiconductor device to be embedded in the windshield itself.

As previously noted, the present invention deals with a backlite for an automotive vehicle. This backlite may be used with both turn signals and a brakelight. An example of a backlite used with brakelights is shown i U.S. Pat. No. 4,488,141 in which discrete lenses and bulb devices are applied to both sides of the pane of glass or plastic itself. This design is, however, costly because it requires drilling holes through the lite and produces an unsightly result because the lenses are visible at all times. Moreover, the lenses themselves may block the view of the driver out of the backlite and will hence be undesirable.

SUMMARY OF THE DISCLOSURE

A backlite for an automotive vehicle with a signaling system includes at least one backlite panel, illumination means positioned at one edge of the panel for selectively introducing light into the interior of the panel whenever the signaling system is energized, and refraction means integrated with the panel for refracting the light from the illumination means so that it will be emitted from the backlite in a pattern recognizable as a signal. The illumination means preferably comprises an electric light assembly including a bulb and a receptacle for the bulb, with the bulb extending from the receptacle in such a location that the bulb will emit light edgewise into the backlite panel whenever the signaling system is energized. A backlite according to the present invention further preferably comprises reflective means applied about the edges of the backlite panel, whereby light introduced into the interior of said panel by the illumination means will be reflected away from the edges of the panel, so as to intensify the light emitted from the panel.

The refraction means preferably comprises a scarified surface integrated with a localized area of the backlite panel.

In a brakelight system according to the present invention, the bulb comprising the illumination means will be lighted whenever the braking system of the vehicle is energized, so that light emanating from the bulb will be refracted by the refractive surface and emitted from the backlite in a pattern recognizable as a brakelight.

In a preferred embodiment of the present invention, a multi-section backlite for an automotive vehicle with braking and turn signaling systems comprises a first backlite panel, constituting the center section of the backlite, including illumination means positioned at one edge of the panel for selectively introducing light into the interior of the panel whenever the braking system is energized, and refraction means associated with the panel for refracting the light so that light will be emitted from the panel in a pattern recognizable as a brakelight whenever the braking system is energized. The multi-section backlite preferably further includes second and third backlite panels adjoining the center section and constituting the outboard sections of the backlite, with each of the panels comprising illumination means similar to the illumination means included in the center section, but responsive to energization of the turn signal system. In this manner, the outboard sections of the backlite will emit light from their refractive surfaces in a pattern recognizable as a turn signal.

A multi-section backlite according to one embodiment of the present invention preferably includes means for isolating each of the several panels from the remaining panels so that light introduced into the interior of any one of the panels by the illuminating means associated with the panels will not enter the interior of the remaining panels.

A multi-section backlite according to the present invention may be deployed not only with brake and turn signals, but also with hazard warning signals, or any other types of signals.

It is an object of the present invention to provide an automotive backlite including a brakelight or other signaling means in which no wires or bulbs or added lenses need to be mounted to that portion of the backlite viewed by the vehicle's driver or passengers.

It is an advantage of the present invention that a backlite according to this invention allows use of a high-mounted brakelight even with limousine trim of the backlight itself.

It is yet a further advantage of the present invention that a backlite produced according to this invention will be constructed more inexpensively than present designs, which include separate lenses and lens holders.

It is yet another advantage of the present invention that a backlite constructed in accord with this invention will be more attractive visually to the motorist because there are no lenses or other highly visible indications of signals until such time as the signal is actually displayed.

BRIEF DESCRIPTION OF THE DRAWINGS

FIG. 1 is a perspective view of a backlite assembly according to the present invention.

FIG. 2 is a perspective view of a second embodiment of a backlite assembly according to the present invention.

FIG. 3 is a partially sectioned elevation of an illumination assembly suitable for use with the present invention, taken along the line 3—3 of FIG. 1.

FIG. 4 is a plan view of a portion of a backlite assembly according to an embodiment of the present invention, showing a reflective foil treatment applied to the edges of the backlite assembly.

DESCRIPTION OF THE PREFERRED EMBODIMENTS

Figure 5:
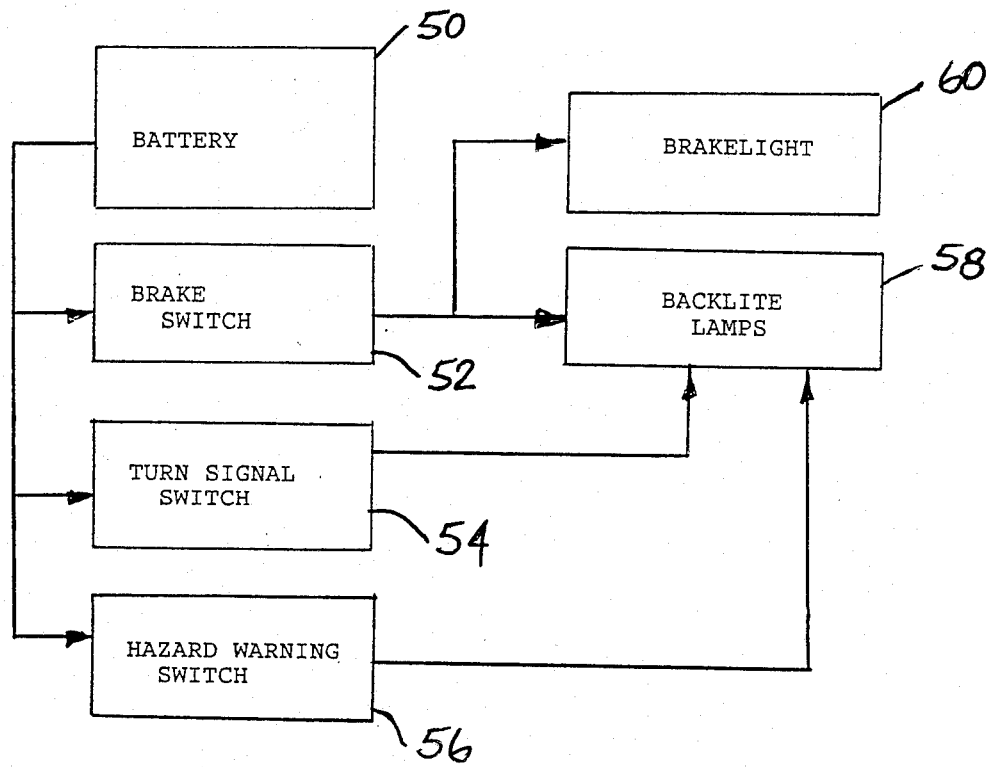
FIG. 5 is a block diagram of a vehicular electrical system including a backlite assembly according to the present invention.

As shown in FIG. 1, a first preferred embodiment of backlite assembly 10 includes backlite panel 12, which may be of glass, plastic or other transparent materials. For purposes of this document, the term "backlite" means a back window of a motor vehicle. As further shown in FIG. 1, backlite 10 includes refraction means comprising scarified surface 14 integrated with backlite panel 12. The scarified surface may be integrated with either side of backlite panel 12. The scarified surface may comprise a sandblasted area or an area which has been marked by grinding. Those skilled in the art will appreciate in view of this disclosure that additional methods may be employed for the purpose of integrating a scarified surface with the backlite. For example, chemical etchants may produce satisfactory results.

Backlite 10 further includes illumination means comprising an illumination assembly 29 which is shown in greater detail in FIG. 3. As shown in FIG. 3, the illumination assembly includes a light bulb including a base 30, globe 32 and filament 34. Those skilled in the art will appreciate in view of this disclosure that the bulb shown in FIG. 3 is merely exemplary of many illumination devices which could be employed with the present invention. Illumination assembly 29 further includes socket 36 into which bulb base 30 fits, and power lead 38 for connection of the bulb to the vehicle's electrical system. Attaching clamp 40 is provided for the purpose of fixing the bulb and its socket to the edge of backlite panel 12 in such a manner that light emitted from the bulb will be selectively introduced edgewise into the backlite panel whenever an appropriate electrical potential is introduced to power lead 38.

In a preferred embodiment, filament 34 will be energized whenever the braking system is energized. Those skilled in the art will appreciate in view of this disclosure that this could be accomplished, for example, by wiring power lead 38 into conventional brakelight circuitry. It is thus easily seen that the electric light assembly and its associated means for lighting the assembly when the braking system is energized comprise, in combination with the refracting surface integrated into the localized area of the backlite, a brakelight system. Those skilled in the art will further appreciate in view of this disclosure that the present backlite system may be employed with a hazard warning system, or with a turn signaling system, as alternatives.

As shown in FIGS. 1, 2, and 3, illumination assembly 29 is situated below scarified surface 14. Without wishing to be bound by the theory stated herein, applicant is able to state that light rays introduced edgewise into backlite panel 12 will traverse the panel so nearly parallel to the side faces of the panel that a high percentage will be reflected within the panel so as not to illuminate the faces of the panel. Light rays which strike scarified surface 14, however, will be refracted or reflected and dispersed out of the planes of the panel's large faces. Accordingly, the scarified surface will glow brilliantly. In the event that scarified surface 14 is used in the position of a brakelight as shown in FIGS. 1 and 2, bulb globe 32 may be tinted a red color to allow the scarified surface to emit red light from backlite panel 12 in a pattern recognizable as a brakelight. Alternatively, the scarified surface could be dyed red, or any other appropriate color, in order to indicate brake operation.

Because a backlite assembly according to the present invention needs no wires running either through, or on the surface of, the backlite panel in order to power the brakelight integrated into the backlite, the system of the present invention is ideally applied to obtain the high-mounted stoplight system currently mandated by federal law in the United States. The absence of any requirement to run electrical conductors through the backlite is of further benefit because the cost of the backlite may be reduced. An additional cost saving results from the fact that the conventional brakelight lens and lens holder may be dispensed with. This prospect is particularly attractive with such backlite treatments as the so-called "limousine" treatment in which the backlite is effectively reduced in size by encroaching fabric top material.

FIG. 2 shows a second preferred embodiment of the present invention in which a multi-section backlite for an automotive vehicle with braking and turn signaling systems comprises three separate backlite panels. As shown in FIG. 2, each of the backlite panels has a separate illumination means comprising illumination assembly 29 and a separate refraction means comprising a scarified surface. A first backlite panel, 16, constituting the center section of the backlite, includes an illumination assembly 29 and scarified surface 14, as before. In combination, the illumination means and scarified surface function as a brakelight. To this end, the appropriate power lead 38 leading to the illumination means associated with the first backlite panel 16 is connected with the brakelight circuit of the vehicle. Thus, whenever the brakes of the vehicle are applied the scarified surface will emit light in a pattern recognizable as a brakelight.

The backlite shown in FIG. 2 also includes second and third outboard backlite panels, 18 and 20 respectively. As previously noted, each of these second and third backlite panels has an illumination assembly 29 associated with it. Scarified surfaces 22 are included with each of the second and third backlite panels, as well. Each scarified surface 22 functions in combination with an illumination assembly 29 as a turn signal indicator. In this case, therefore, power leads 38 are wired to appropriate segments of the vehicle's turn signal wiring. This will permit the second and third backlite panels to emit light from the scarified surfaces, in the manner previously disclosed, upon energization of the vehicle's turn signal system. These emissions of light will be recognizable as turn signals by any motorist following a vehicle equipped according to the present invention.

As shown in FIG. 5, a system according to the present invention includes battery 50 which is the usual vehicle battery and which feeds brakelight switch 52, turn signal switch 54, and hazard warning switch 56. In turn, brake switch 52 feeds brakelight 60 and one or more backlite lamps 58. Turn signal switch 54 will also feed the turn signals (not shown) and one or more backlite lamps 58. Similarly, hazard warning switch 56 will feed one or more backlite lamps 58.

Because the backlite shown in FIG. 2 is equipped with three individual illumination assemblies, it is necessary to isolate the backlite panels from each other so that light introduced into one of the panels by an illumination assembly 29 does not leak or transmit to the interiors of either of the remaining panels. For example, without an anti-transmissive isolator system shown as elements 26 in FIG. 2, energization of the illumination assembly associated with the third backlite panel would cause light to be emitted not only from the scarified surface included in the third backlite panel, but also from the scarified surfaces within the first and second backlite panels. Accordingly, anti-transmissive isolators 26 are employed to prevent light transmission between the various backlite panels. In practice, the anti-transmissive isolators could comprise, for example, breaks between the first backlite panel and the second and third backlite panels. Those skilled in the art will appreciate in view of this disclosure that many means exist for providing an optical barrier between the adjacent backlite panels.

Those skilled in the art will appreciate in view of this disclosure that a multi-section backlite according to the present invention could comprise more than three backlite panels, according to the needs of the particular signaling system being implemented. More than three panels could be employed, for example, with a system including brake and turn signals as well as hazard warning signals.

A backlite constructed in accordance with the present invention will transmit a high percentage of the light originating from the illumination assembly to the eyes of the viewer. In the event, however, that greater performance is sought from the system described herein, a reflective foil, as shown in FIG. 4, could be applied to the edges of the various backlite panels. This reflective foil would function such that light introduced into the interior of the panel by the illuminating means would be reflected away from the edges of the panels so as to intensify the light emitted from the panels.

The invention has thus been shown and described with reference to specific embodiments; however, it should be noted that the invention is in no way limited to the details of the illustrated systems and that changes and modifications may be made without departing from the scope of the appended claims.

I claim:

1. A backlite for an automotive vehicle with a signaling system, said backlite comprising:
   at least one backlite panel;
   illumination means positioned at one edge of said panel for selectively introducing light into the interior of said panel whenever said signaling system is energized; and
   refraction means integrated with said panel for refracting said light so that said light will be emitted from said backlite in a pattern recognizable as a signal.

2. A backlite according to claim 1 further comprising reflective means applied about the edges of said panel, whereby light introduced into the interior of said panel by said illuminating means will be reflected away from said edges, so as to intensify the light emitted from said panel.

3. A backlite according to claim 1 wherein said illumination means comprises an electric light assembly including a bulb and a receptacle for said bulb, with said bulb extending from said receptacle in such a location that said bulb will emit light edgewise into said backlite panel whenever said signaling system is energized.

4. A backlite according to claim 1 wherein said refraction means comprises a scarified surface integrated into a localized area of said backlite panel.

5. A backlite according to claim 1 wherein said signaling system comprises a brakelight system.

6. A backlite according to claim 1 wherein said signaling system comprises a turn signaling system.

7. A backlite according to claim 1 wherein said signaling system comprises a hazard warning signal system.

8. A brakelight system for an automotive vehicle with a backlite and a braking system, said brakelight system comprising:
   a refracting surface integrated into a localized area of said backlite panel;
   illumination means comprising an electric light assembly including a bulb and a receptacle for said bulb, with said bulb extending from said receptacle in such a location that said bulb will emit light edgewise into said backlite panel; and
   means for lighting said bulb when said braking system of said automotive vehicle is energized, whereby said light will be refracted by said refracting surface and emitted from said backlite in a pattern recognizable as a brakelight.

9. A multi-section backlite for an automotive vehicle with braking and turn signaling systems, said backlite comprising:
   a first backlite panel, constituting the center section of said backlite, comprising:
      illumination means positioned at one edge of said panel for selectively introducing light into the interior of said panel whenever said braking system is energized; and
      refraction means associated with said panel for refracting said light so that said light will be emitted from said panel in a pattern recognizable as a brakelight whenever said braking system is energized;
   second and third backlite panels adjoining said center section and constituting the outboard sections of said backlight, with each of said panels comprising:
      illumination means positioned at one edge of said panel for selectively introducing light into the interior of said panel when said turn signaling system is energized; and
      refraction means associated with said panel for refracting light so that said light will be emitted from one of said panels in a pattern recognizable as a turn signal whenever said turn signaling system is energized; and
   means for isolating each of said panels from the remaining panels so that light introduced into the interior of any one of said panels by the illuminating means associated with said panels will not enter the interior of the remaining panels.

10. A multi-section backlite according to claim further comprising reflective means applied about the edges of each of said panels, whereby light introduced into the interior of said panels by said illuminating means will be reflected away from said edges, so as to intensify the light emitted from said panels.

* * * * *